(12) United States Patent
La Rosa

(10) Patent No.: US 11,444,484 B2
(45) Date of Patent: Sep. 13, 2022

(54) SENSOR, CORRESPONDING SYSTEM AND OPERATING METHOD

(71) Applicant: STMicroelectronics S.r.l., Agrate Brianza (IT)

(72) Inventor: Roberto La Rosa, Viagrande (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 273 days.

(21) Appl. No.: 16/815,770

(22) Filed: Mar. 11, 2020

(65) Prior Publication Data

US 2020/0303952 A1 Sep. 24, 2020

(30) Foreign Application Priority Data

Mar. 21, 2019 (IT) .......................... 102019000004149

(51) Int. Cl.
*H02J 50/00* (2016.01)
*H02J 50/80* (2016.01)
(Continued)

(52) U.S. Cl.
CPC ............ *H02J 50/001* (2020.01); *H02J 50/05* (2016.02); *H02J 50/30* (2016.02); *H02J 50/80* (2016.02)

(58) Field of Classification Search
CPC .. H02J 50/001; H02J 7/345; H02J 7/35; H02J 50/05; H02J 50/30; H02J 50/20;
(Continued)

(56) References Cited

U.S. PATENT DOCUMENTS

| 7,081,693 B2 * | 7/2006 | Hamel | ...................... H02J 7/32 |
| | | | 307/151 |
| 7,884,727 B2 * | 2/2011 | Tran | ...................... A61B 5/0205 |
| | | | 342/28 |

(Continued)

FOREIGN PATENT DOCUMENTS

| FR | 3057350 A1 | 4/2018 |
| WO | 2013038295 A1 | 3/2013 |

OTHER PUBLICATIONS

IT Search Report and Written Opinion for IT Appl. No. 102019000004149 dated Oct. 14, 2019 (8 pages).

*Primary Examiner* — Helen Rossoshek
(74) *Attorney, Agent, or Firm* — Crowe & Dunlevy

(57) ABSTRACT

An energy-harvesting generator provides energy for storage in a capacitor. A sensing circuit senses a voltage across the capacitor and generates an activation signal as a function of the sensed voltage. The activation signal switches from a first value to a second value when the sensed voltage reaches an upper threshold and switches from the second value to the first value when the sensed voltage reaches a lower threshold. A signal transmitter powered by stored energy in the capacitor responds to the activation signal being switched to the second value by activating and transmitting a transmission signal. The signal transmitter further responds to the activation signal being switched to the first value by discontinuing transmission of the transmission signal and deactivating. A duration of time elapsing between de-activation and activation of the transmitter is indicative of an amount of energy harvested by the energy-harvesting electric generator.

20 Claims, 3 Drawing Sheets

(51) Int. Cl.
*H02J 50/05* (2016.01)
*H02J 50/30* (2016.01)

(58) Field of Classification Search
CPC .......... H02J 50/27; H02J 50/80; H02J 50/402; H02J 7/025; H04Q 9/00; H04Q 2209/886; H04Q 2209/43
See application file for complete search history.

(56) References Cited

U.S. PATENT DOCUMENTS

| | | | |
|---|---|---|---|
| 8,362,745 B2* | 1/2013 | Tinaphong | H02J 7/025 |
| | | | 320/108 |
| 9,318,951 B2* | 4/2016 | Shirahata | H02M 3/00 |
| 9,595,893 B2* | 3/2017 | Ocalan | H02N 11/002 |
| 2003/0156047 A1* | 8/2003 | Wobben | F03D 80/10 |
| | | | 340/983 |
| 2008/0065290 A1* | 3/2008 | Breed | G01L 17/00 |
| | | | 701/31.4 |
| 2015/0128733 A1 | 5/2015 | Taylor et al. | |
| 2015/0224845 A1* | 8/2015 | Anderson | B60G 17/052 |
| | | | 701/37 |
| 2017/0147279 A1* | 5/2017 | Dobaj | G05B 19/409 |
| 2018/0143675 A1* | 5/2018 | Sato | H02J 7/35 |
| 2019/0098723 A1* | 3/2019 | Sadwick | F21K 9/272 |
| 2020/0076240 A1* | 3/2020 | Papadopoulos | H02J 50/20 |
| 2020/0118401 A1* | 4/2020 | Zalewski | G06Q 20/12 |
| 2021/0051591 A1* | 2/2021 | Robin | H04W 52/02 |

* cited by examiner

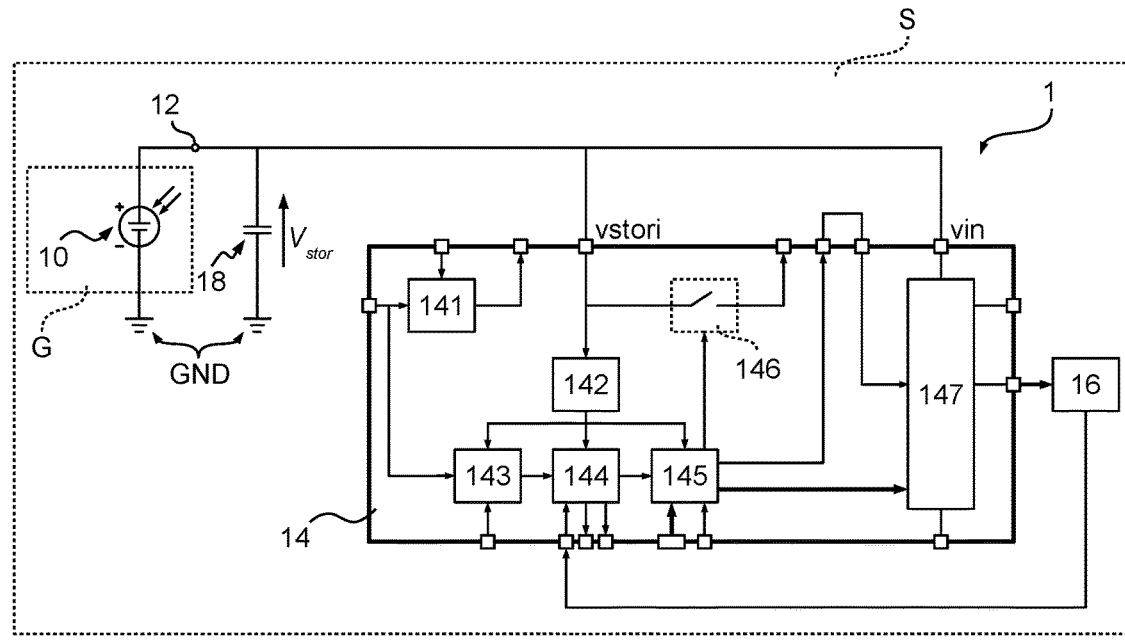
FIG. 1
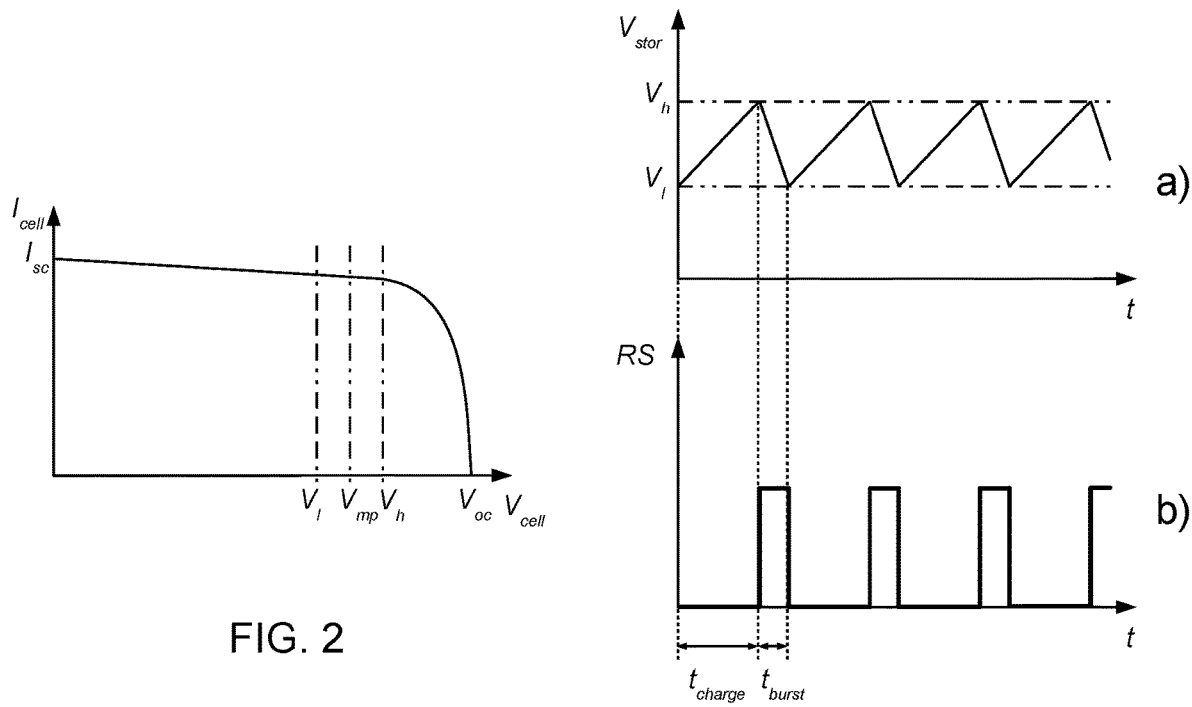
FIG. 2
FIG. 3

SENSOR, CORRESPONDING SYSTEM AND OPERATING METHOD

PRIORITY CLAIM

This application claims the priority benefit of Italian Application for Patent No. 102019000004149, filed on Mar. 21, 2019, the content of which is hereby incorporated by reference in its entirety to the maximum extent allowable by law.

TECHNICAL FIELD

The description relates to sensors such as wireless and battery-free sensors for application, for example, in home automation systems and/or wireless sensor networks.

Such sensors may be, for instance, light (intensity) sensors, electromagnetic power sensors (for example, for measuring electromagnetic pollution), vibration sensors, temperature sensors.

For instance, exemplary embodiments can relate to wireless, battery-free light sensors with (solar) energy harvesting capabilities, for example for the use with twilight switches.

BACKGROUND

A wireless sensor network (WSN) may comprise a certain number of spatially dispersed and dedicated sensors for monitoring the physical conditions of an environment. For instance, sensors in a wireless sensor network can measure environmental conditions like temperature, sound, pollution levels, humidity, wind, light intensity, vibrations, electromagnetic pollution, and so on. The dispersed sensors may communicate the collected data to a central processing unit, which may perform organization and/or processing of the data.

Thus, sensors in a wireless sensor network—for example, as increasingly used in home automation systems—may involve collecting data and sharing the collected data (with a central processing unit, and/or amongst themselves) wirelessly.

Taking advantage of their wireless communication capability, sensors in a wireless sensor network may be positioned in places which are uncomfortable to reach, for example because no cables are required for data communication and power supply.

On the other hand, placing sensors in hard-to-reach locations may render maintenance operations somehow difficult to be carried out. For instance, battery-supplied wireless sensors may involve substituting the power source at regular time intervals, thus requiring troublesome service operations.

An exemplary type of wireless sensor in the field of home automation and "green" (such as, energy-efficient) buildings are light sensors, for example for the use with twilight switches.

A twilight switch is a device which may comprise a light sensor to trigger a relay switch. Typically, twilight switches are biased through the main power supply and need to be wired. However, this solution may imply low flexibility of installation.

Wireless twilight switches are also available in the market. Even if wireless twilight switches may provide higher flexibility of use, they are typically battery-supplied and involve a dedicated light sensor to measure light intensity. The presence of a battery involves troublesome maintenance operations as discussed above, and may also involve a limited flexibility for the placement of the sensor.

Examples of wireless, battery-supplied twilight switches are the devices available to the public with the trade designations of Nexa LBST-604, ElkoEP RFSOU-1, and Home Easy HE404EU.

Such known wireless, battery-supplied devices, despite providing some improvements concerning the flexibility of use (during and after installation) if compared to wired devices, still have many drawbacks concerning service and maintenance operations.

Similarly, also other types of sensors (for example, vibration sensors, temperature sensors, etc.) may be biased through the main power supply and may need to be wired.

Despite the extensive activity in the area, further improved solutions are desirable.

For instance, solutions are desirable for providing sensors which have, at the same time, measuring capabilities and energy harvesting capabilities, for example for realizing battery-free and so-called "set-and-forget" sensor nodes. Set-and-forget sensor nodes may be inherently (almost) maintenance-free, thereby facilitating IoT (Internet-of-Things) devices being virtually ubiquitous.

Specifically, solutions are desirable wherein an energy-harvesting electric generator (for example, a photovoltaic generator such as a photovoltaic cell, a radio-frequency energy harvester, a vibrational energy harvester, a thermo-electric generator, etc.) may provide at the same time power supply functionality and measurement functionality of a sensor. Such sensors may thus be wireless and battery-free.

There is a need in the art to contribute in providing such improved solutions.

SUMMARY

According to one or more embodiments, a sensor (for example, a light sensor) provides the improved solution.

One or more embodiments may relate to a corresponding system, such as an "intelligent" twilight switch or a wireless sensor network.

One or more embodiments may relate to a corresponding operating method.

One or more embodiments may, for instance, facilitate providing light sensors for measuring light intensity, wherein a photovoltaic generator in the light sensor provides both power supply and light intensity measurement capabilities of the sensor. Light sensors according to one or more embodiments may thus be wireless and/or battery-free.

BRIEF DESCRIPTION OF THE DRAWINGS

One or more embodiments will now be described, by way of example only, with reference to the annexed figures, wherein:

FIG. 1 is a block diagram exemplary of a sensor according to one or more embodiments;

FIG. 2 is exemplary of a current-voltage (I-V) characteristic curve of a photovoltaic generator, for example, a photovoltaic cell;

FIG. 3 is exemplary of possible time behavior of signals in embodiments;

DETAILED DESCRIPTION

Figure 4:
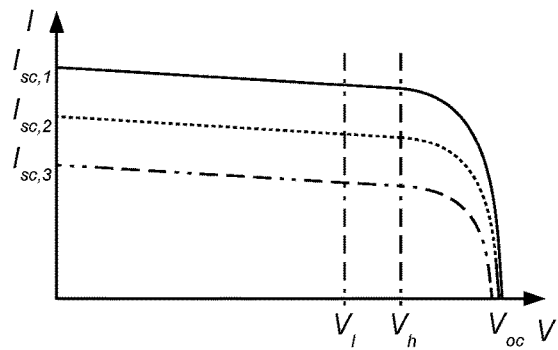
FIG. 4 is exemplary of current-voltage (I-V) characteristic curves of a photovoltaic generator for different values of illuminance.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

It will be understood that reference to light sensors is made throughout the present description by way of example and for the sake of simplicity only, while one or more embodiments of the present description may relate to different types of sensors such as vibration sensors, temperature sensors, radio-frequency electromagnetic radiation sensors, and the like.

FIG. 1 is exemplary of a block diagram of a light sensor 1, for example a wireless light sensor.

The wireless light sensor 1 may comprise a photovoltaic generator 10, for example a photovoltaic cell, coupled between a (positive) node 12 and a reference (ground) node GND, and a capacitor 18 coupled in parallel to the photovoltaic generator 10, such as between the node 12 and the reference node GND.

Of course, sensors other than a light sensor may comprise different types of energy-harvesting electric generator G in place of a photovoltaic generator 10. For instance, a vibration sensor may comprise a kinetic energy harvester G, a temperature sensor may comprise a thermoelectric generator G, a radio-frequency electromagnetic radiation sensor may comprise a radio-frequency harvester G having an antenna.

On one hand, the capacitor 18 may store the energy provided by the photovoltaic generator 10, for example, being charged by the current generated by the photovoltaic generator 10. On the other hand, the capacitor 18 may provide energy for the operation of a sensing circuit 14 (for example, an integrated circuit) coupled to the node 12. A voltage $V_{stor}$ can be measured across the capacitor 18, such as between the node 12 and the reference node GND.

The sensing circuit 14 as exemplified in FIG. 1 may comprise plural input pins and output pins, and in particular the sensing circuit 14 may be configured to sense the voltage $V_{stor}$ at the node 12, for example via connections of node 12 to the pins vstori and/or vin exemplified in FIG. 1.

As exemplified in FIG. 1, the sensing circuit 14 may comprise a plurality of circuit blocks, such as: an RF to DC transducer 141, an ultra-low-power management circuit block 142, an ASK/FSK demodulator 143, a digital decoder 144, a control logic circuit block 145, an electronic switch 146, and a DC/DC converter 147.

Additionally, the sensing circuit 14 may be coupled to a signal transmitter 16, for example a radio transmitter such as a sort of radio beacon. For instance, the signal transmitter 16 may comprise a Bluetooth Low Energy (BLE) radio transmitter.

In one or more embodiments the photovoltaic generator 10, the capacitor 18, the (integrated) sensing circuit 14 and the signal transmitter 16 may be provided on a common substrate S, for example a printed circuit board.

A sensor as exemplified in FIG. 1 may thus operate according to the operation principle described in the following, for example with reference to FIGS. 2 to 5.

FIG. 2 is exemplary of a current-voltage (I-V) characteristic curve of a photovoltaic generator, such as a photovoltaic cell 10 of the light sensor 1. The photovoltaic cell may be operated by keeping the voltage drop $V_{cell}$ across the cell around a target value $V_{mp}$, where the cell provides the maximum output power. A lower voltage threshold $V_l$ and an upper voltage threshold $V_h$ may be defined, so that the target voltage value $V_{mp}$ is between $V_l$ and $V_h$, with $V_l < V_h$.

Thus, the sensing circuit 14 coupled to the photovoltaic generator 10 and to the capacitor 18 may be configured (for example, by means of the ultra-low-power management circuit block 142) to:

sense (for example, continuously) the voltage $V_{stor}$ at node 12 (for example, via connection to the pin vstori), the voltage $V_{stor}$ being indicative of the voltage $V_{cell}$ across the photovoltaic generator 10 (and in some cases—as the one exemplified herein—being approximately equal to the voltage $V_{cell}$);

as a result of the sensed voltage $V_{stor}$ reaching the upper voltage threshold $V_h$, activate the signal transmitter 16;

as a result of the sensed voltage $V_{stor}$ reaching the lower voltage threshold $V_1$, de-activate the signal transmitter 16.

It will be understood that activation of the signal transmitter 16 may result in a certain amount of power being drained by the sensing circuit 14 from the capacitor 18 (for example, via connection of the DC/DC converter 147 to the capacitor 18 by means of the pin vin), with such drained power which may be higher than the power provided by the photovoltaic generator 10, so that a sort of regular (for example, periodic) activation of the signal transmitter 16 results from the above-discussed operation scheme, as exemplified in FIG. 3.

FIG. 3, comprising portions a) and b), is exemplary of possible time behavior of signals in the sensing circuit 14. Signal $V_{stor}$ in portion a) of FIG. 3 is indicative of the voltage $V_{stor}$ sensed at node 12, and signal RS in portion b) of FIG. 3 is exemplary of an activation signal generated by the sensing circuit 14 for the signal transmitter 16.

In a first phase, the activation signal RS is low and the signal transmitter 16 is idle (inactive). Thus, the sensing circuit 14 drains almost zero power from the capacitor 18, resulting in the capacitor 18 being charged by the current generated by the photovoltaic generator 10 and the voltage $V_{stor}$ increasing.

As a result of the voltage $V_{stor}$ reaching the upper threshold $V_h$, the sensing circuit 14 triggers the activation of the signal transmitter 16 (signal RS is high). As a result, the sensing circuit 14 drains a certain amount of power from the capacitor 18 for supplying the signal transmitter 16. In case the power drained by the circuit 14 is higher than the power provided by the photovoltaic generator 10, the capacitor 18 (gradually) discharges, eventually reaching the lower threshold $V_l$.

As a result of the voltage $V_{stor}$ reaching the lower threshold $V_l$, the signal transmitter 16 may be de-activated (signal RS is low) and a new operating cycle may start.

As exemplified in FIG. 3, the Inventors have noted that the duration $t_{charge}$ of the first phase (during which the signal transmitter 16 is not active) is usually longer than the duration $t_{burst}$ of the second phase (during which the signal transmitter 16 is active).

Figure 5:
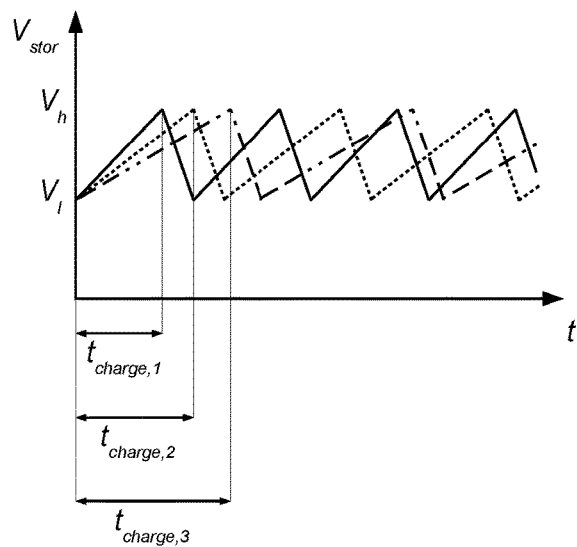
FIG. 5 is exemplary of possible time behavior of signals in embodiments for different values of illuminance.

Also, the Inventors have noted that the duration of such time intervals $t_{charge}$ and $t_{burst}$ (in particular, of time interval $t_{charge}$) may be dependent on the illuminance $E_V$ incident on the surface of the photovoltaic generator 10, for example on the photosensitive surface of a photovoltaic cell 10, as exemplified in FIGS. 4 and 5.

FIG. 4 is exemplary of current-voltage (I-V) characteristic curves of a photovoltaic generator for different values of illuminance $E_V$. In particular, the solid curve is exemplary of a case of high illuminance, the dotted curve is exemplary of a case of average illuminance, and the dotted-and-dashed curve is exemplary of a case of low illuminance. Thus, the maximum output power $P_{out}$ provided by the photovoltaic generator 10 when operating between the voltage thresholds $V_l$ and $V_h$ depends on the illuminance shining on the photovoltaic generator, as well as other factors, according to the following equations (1) and (2):

$$P_{in} = \alpha \cdot E_V \quad (1)$$

$$P_{out} = \text{Eff}_{PV} \cdot P_{in} = \text{Eff}_{PV} \cdot \alpha \cdot E_V \quad (2)$$

wherein $E_V$ is the illuminance incident on the surface of the photovoltaic generator 10, $\alpha$ is the area of the photosensitive surface of the photovoltaic generator 10, $P_{in}$ is the luminous power (also called luminous flux) incident on the surface of the photovoltaic generator 10, $\text{Eff}_{PV}$ is the conversion efficiency of the photovoltaic generator 10, and $P_{out}$ is the output power provided by the photovoltaic generator 10 for charging the capacitor 18.

A higher illuminance $E_V$ would thus result in a higher power $P_{out}$ provided by the photovoltaic generator 10 for charging the capacitor 18.

The energy $E_{Cstor}$ necessary for recharging the capacitor 18 from a voltage $V_l$ to a voltage $V_h$ in a time interval $t_{charge}$ may be computed according to the following equation (3):

$$E_{C_{stor}} = C_{stor} \cdot \frac{V_h^2 - V_l^2}{2} \quad (3)$$

wherein $C_{stor}$ is the capacitance of the capacitor 18.

The Inventors have thus noted that higher values of illuminance $E_V$ may result in shorter durations of the time interval $t_{charge}$, according to the following equation (4):

$$t_{charge} = \frac{E_{C_{stor}}}{P_{out}} = C_{stor} \cdot \frac{V_h^2 - V_l^2}{2 \cdot P_{out}} = C_{stor} \cdot \frac{V_h^2 - V_l^2}{2 \cdot \text{Eff}_{PV} \cdot \alpha \cdot E_V} \quad (4)$$

FIG. 5 is exemplary of possible time behaviors of signal $V_{stor}$ as sensed by the sensing circuit 14 for different values of illuminance $E_V$. As for FIG. 4, the solid curve is exemplary of a case of high illuminance, the dotted curve is exemplary of a case of average illuminance, and the dotted-and-dashed curve is exemplary of a case of low illuminance.

It is shown that the duration $t_{charge,1}$ corresponding to a case of high illuminance may be shorter than the duration $t_{charge,2}$ corresponding to a case of average illuminance, which in turn may be shorter than the duration $t_{charge,3}$ corresponding to a case of low illuminance.

By inverting equation (4) above, the Inventors have noted that the value of illuminance $E_V$ may be computed as a function of the duration of the time interval $t_{charge}$, according to the following equation (5):

$$E_V = C_{stor} \cdot \frac{V_h^2 - V_l^2}{2 \cdot \text{Eff}_{PV} \cdot \alpha \cdot t_{charge}} \quad (5)$$

Figure 6:
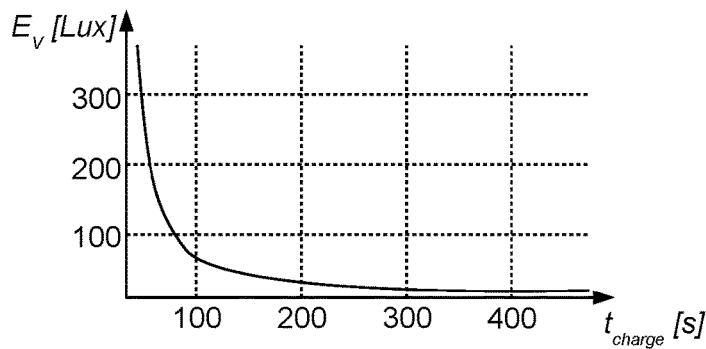
FIG. 6 is exemplary of a possible calibration curve of embodiments.

FIG. 6 is exemplary of a possible relationship between the measured time interval $t_{charge}$ and the corresponding values of illuminance $E_V$ for a certain set of values of $C_{stor}$, $V_h$, $V_l$, $\text{Eff}_{PV}$ and $\alpha$.

Therefore, a sensor as exemplified in FIG. 1 may operate as a wireless, battery-free light sensor, since it may generate signal transmission events (for example, radio signal transmission events) at (regular) time intervals, wherein the duration $t_{charge}$ of such regular time intervals between one radio event and the next one is dependent on the value of illuminance $E_V$ shining on the photovoltaic generator 10, thus being indicative of the amount of light in the environment where the wireless light sensor 1 is placed.

Figure 7:
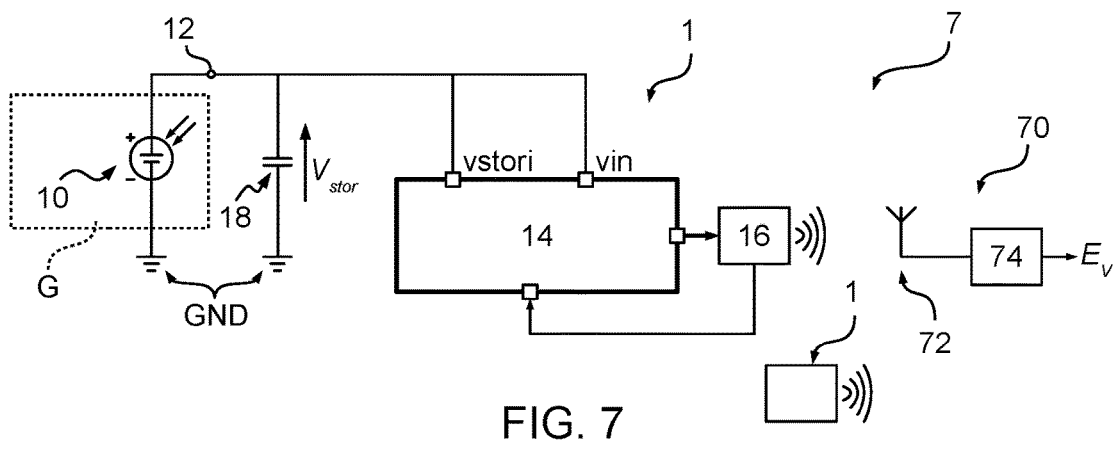
FIG. 7 is a block diagram exemplary of a system according to one or more embodiments.

In one or more embodiments as exemplified in FIG. 7, a light sensor 1 as exemplified in FIG. 1 may be configured to co-operate with a wirelessly connected device 70 (for example, a central processing unit of a wireless sensor network, or an "intelligent" twilight switch).

Such device 70 may comprise signal receiving circuitry 72 (for example, a radio receiver, such as a Bluetooth low energy radio receiver) for receiving the (radio) signal generated by the signal transmitter 16, and a processing unit or processing circuitry 74 configured for measuring the time interval between two consecutive (radio) signal transmission events received at the signal receiving circuitry 72. The processing circuitry 74 may be further configured to provide as output a value of illuminance $E_V$ as a function of the measured time intervals.

For instance, in one or more embodiments the processing circuitry 74 may have stored a set of values $C_{stor}$, $V_h$, $V_l$, $\text{Eff}_{PV}$, $\alpha$ which correspond to a certain light sensor 1, and may compute a value of illuminance as a function of the measured time intervals $t_{charge}$ on the basis of equation (5) above.

In one or more embodiments, a device 70 may wirelessly communicate with a plurality of light sensors 1, and the processing circuitry 74 may have stored respective sets of values $C_{stor}$, $V_h$, $V_l$, $\text{Eff}_{PV}$, $\alpha$ which correspond to respective light sensors in the plurality of light sensors for correctly computing the respective values of illuminance.

In one or more embodiments, the processing circuitry 74 may be programmable, such as the stored values $C_{stor}$, $V_h$, $V_l$, $\text{Eff}_{PV}$, $\alpha$ may be programmed (for example, erased and written multiple times).

Alternatively, in one or more embodiments the processing circuitry 74 may provide as output a value of illuminance based on look-up tables, which provide a correspondence between a measured time interval $t_{charge}$ and a corresponding value of illuminance. The processing circuitry 74 may store a plurality of look-up tables for co-operation with a plurality of light sensors. Such look-up table(s) may be programmable (for example, erased and written multiple times).

In one or more embodiments, curves such as the curve exemplified in FIG. 6 may be used as calibration curves of a light sensor 1, for example for setting the values of a respective look-up table.

Therefore, one or more embodiments may provide a wireless, battery free light sensor 1 wherein a photovoltaic generator 10 provides both energy harvesting and light measurement capabilities, without the need of a dedicated light sensing module. The light sensor 1 may co-operate with an external, wirelessly connected device, for example a twilight switch which may be triggered as a function of the measured level of illuminance $E_V$.

In one or more embodiments, the light intensity at the light sensor 1 can be measured by measuring the time needed to harvest a certain amount of energy $E_{Cstor}$ by means of a photovoltaic generator 10 (for example, a photovoltaic cell), wherein the amount of energy $E_{Cstor}$ may be defined according to the energy requirements of the operation to be performed and may depend on the values of the parameters $C_{stor}$, $V_l$ and $V_h$. By way of example, the amount of energy $E_{Cstor}$ may be sufficient to turn on a radio transmitter 16, for example a Bluetooth Low Energy (BLE) radio, to send a "beacon" signal as exemplified in portion b) of FIG. 3.

A light sensor and/or a corresponding system according to one or more embodiments may thus provide various advantages, such as: no need of cables for power supply and/or data communication; reduced maintenance (for example, no replacement of batteries required); area reduction of the light sensor, since the whole sensor may be as small as a photovoltaic cell 10 (for example, of the type mounted on solar-powered calculators), for instance with the sensing circuit 14 and the signal transmitter 16 being located below the photovoltaic cell 10; high flexibility and ease of installation; possibility of being programmed (for example, having firmware programmable through a so-called smart phone "app"), for example for setting the activation (switching) threshold of a twilight switch cooperating with the light sensor; and simplicity and reliability of the measurement technique.

It will be noted that what has been disclosed herein with reference to wireless (for example, radio) signal transmission between the sensor 1 and the processing circuitry 74 may apply also to wired signal transmission, without modifying the illuminance measurement principle based on measurement of time intervals $t_{charge}$. Thus, the extent of protection is not limited to wireless signal transmission between the sensor 1 and the processing circuitry 74.

As exemplified herein, a sensor (for example, 1), for example, a light sensor, may comprise:
an energy-harvesting electric generator (for example, G),
a capacitor (for example, 18) coupled to the energy-harvesting electric generator to store energy harvested by the energy-harvesting electric generator,
a sensing circuit (for example, 14) coupled to the capacitor and configured to sense a voltage signal (for example, $V_{stor}$) across the capacitor and generate an activation signal (for example, RS) as a function of the voltage signal sensed, wherein the activation signal is switchable from a first value (for example, low or high) to a second value (for example, high or low, respectively) as a result of the voltage signal sensed reaching an upper threshold (for example, $V_h$) and from the second value to the first value as a result of the voltage signal sensed reaching a lower threshold (for example, $V_l$); and
a signal transmitter (for example, 16) coupled to the capacitor (for example, via the sensing circuit) to be energized thereby and to the sensing circuit, wherein the signal transmitter is sensitive to the activation signal from the sensing circuit and is configured to:
activate and transmit a transmission signal as a result of the activation signal being switched to the second value, and
de-activate and discontinue transmission of the transmission signal as a result of the activation signal being switched to the first value,
wherein a duration of the time intervals (for example, $t_{charge}$) elapsing between de-activations and subsequent activations of the transmitter is indicative of the energy (for example, energy per unit time) harvested by the energy-harvesting electric generator.

For instance, the signal transmitter may be provided with energy from the capacitor 18 via a DC/DC converter (for example, 147) in the sensing circuit.

As exemplified herein, the signal transmitter may comprise a wireless signal transmitter, preferably a radio transmitter, more preferably a Bluetooth low energy radio transmitter.

In a sensor as exemplified herein, the energy-harvesting electric generator may comprise a photovoltaic generator (for example, 10) having a photosensitive surface, and the duration of the time intervals elapsing between de-activations and subsequent activations of the transmitter may be indicative of the illuminance at the photosensitive surface of the photovoltaic generator.

As previously discussed, one or more embodiments of the present description may relate to different types of sensors such as vibration sensors, temperature sensors, radio-frequency electromagnetic radiation sensors, and the like.

Figure 8:
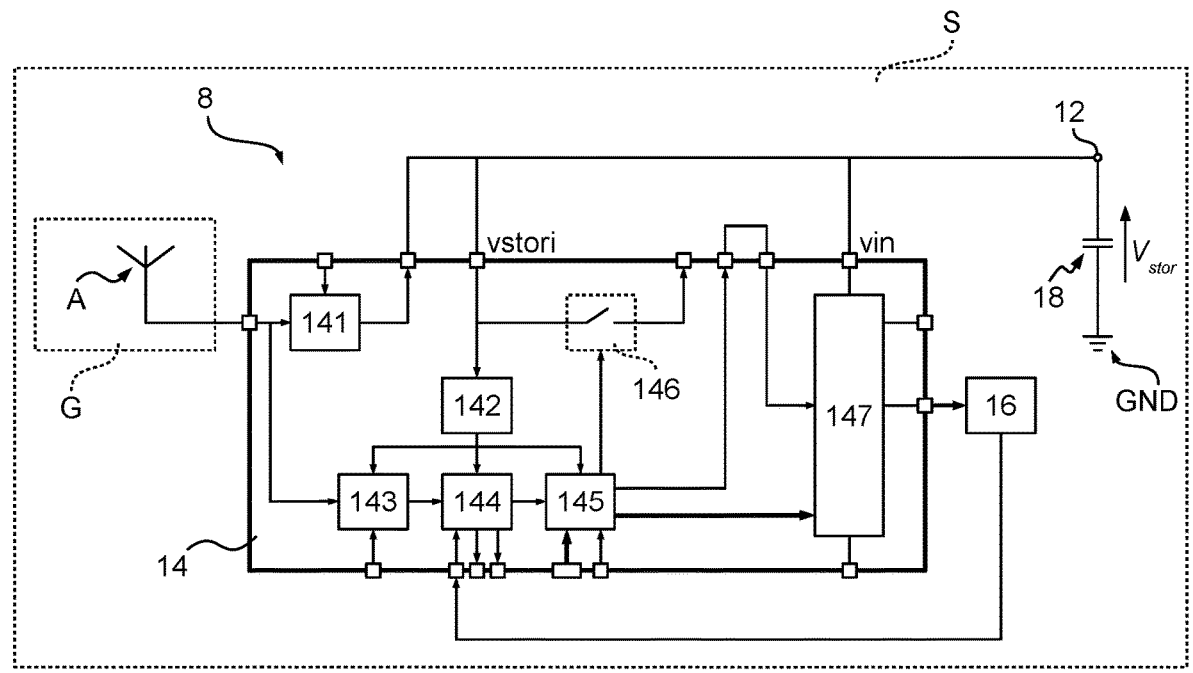
FIG. 8 is a block diagram exemplary of a sensor according to one or more embodiments.

Purely by way of example, FIG. 8 is a block diagram exemplary of a radio-frequency electromagnetic radiation sensor 8, for example, a wireless electromagnetic radiation sensor.

The wireless sensor 8 may comprise a radio-frequency energy harvester G, for example, having an antenna A, coupled to a RF to DC transducer 141 in the sensing circuit 14. The RF to DC transducer 141 may be coupled to the storage capacitor 18 and configured for transforming a RF voltage generated by the harvester G into a DC voltage for supplying the storage capacitor 18.

A sensor 8 as exemplified in FIG. 8 for sensing "environmental" RF power may operate according to an operation principle similar to that described with reference to FIGS. 1 to 7 for a light sensor.

In particular, wherein: $P_{RF}$ is the (unknown) RF power available at the antenna A, $G_R$ is the gain of the antenna A (known for a certain antenna), and $\text{Eff}_{RF2DC}$ is the efficiency of the RF to DC transducer 141 (known for a certain transducer), the maximum output power $P_{out}$ provided by the antenna A via the RF to DC transducer 141 when operating between the voltage thresholds $V_l$ and $V_h$ depends on the RF power available at the antenna A, as well as other factors, according to the following equation (6):

$$P_{out} = \text{Eff}_{RF2DC} \cdot P_{RF} \tag{6}$$

A higher RF power $P_{RF}$ available at the antenna A would thus result in a higher power $P_{out}$ provided by the antenna A for charging the capacitor 18.

The energy $E_{C_{stor}}$ necessary for recharging the capacitor 18 from a voltage $V_l$ to a voltage $V_h$ in a time interval $t_{charge}$ may be computed according to the same equation (3) previously presented, so that higher values of RF power $P_{RF}$ available at the antenna A may result in shorter durations of the time interval $t_{charge}$, according to the following equation (7):

$$t_{charge} = \frac{E_{C_{stor}}}{P_{out}} = C_{stor} \cdot \frac{V_h^2 - V_l^2}{2 \cdot P_{out}} = C_{stor} \cdot \frac{V_h^2 - V_l^2}{2 \cdot \mathit{Eff}_{RF2DC} \cdot P_{RF}} \quad (7)$$

By inverting equation 7 above, the Inventors have noted that the value of RF power $P_{RF}$ available at the antenna A may be computed as a function of the duration of the time interval $t_{charge}$, according to the following equation (8):

$$P_{RF} = C_{stor} \cdot \frac{V_h^2 - V_l^2}{2 \cdot \mathit{Eff}_{RF2DC} \cdot t_{charge}} \quad (8)$$

Thus, in a sensor as exemplified herein, the energy-harvesting electric generator may comprise a radio-frequency energy harvester having an antenna, and the duration of the time intervals elapsing between de-activations and subsequent activations of the transmitter may be indicative of the radio-frequency electromagnetic power received at the antenna of the radio-frequency energy harvester.

Figure 9:
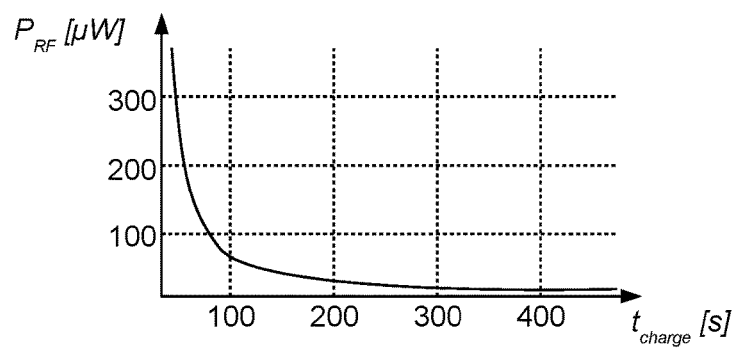
FIG. 9 is exemplary of a possible calibration curve of embodiments.

FIG. 9 is exemplary of a possible relationship between the measured time interval $t_{charge}$ and the corresponding values of RF power Pay available at the antenna for a certain set of values of $C_{stor}$, $V_h$, $V_l$ and $\mathit{Eff}_{RF2DC}$.

By way of further, non-limiting example, in a sensor as exemplified herein the energy-harvesting electric generator may comprise a vibrational energy harvester, and the duration of the time intervals elapsing between de-activations and subsequent activations of the transmitter may be indicative of the amount of energy harvested by the vibrational energy harvester.

By way of further, non-limiting example, in a sensor as exemplified herein the energy-harvesting electric generator may comprise a thermoelectric energy harvester, and the duration of the time intervals elapsing between de-activations and subsequent activations of the transmitter may be indicative of the temperature at the thermoelectric energy harvester.

As exemplified herein, a system (for example, 7) may comprise:
- at least one sensor according to one or more embodiments,
- signal receiving circuitry (for example, 72) configured to receive the transmission signal transmitted by the signal transmitter of the at least one sensor, and
- processing circuitry (for example, 74) coupled to the signal receiving circuitry and configured to:
  measure the duration of the time intervals (for example, $t_{charge}$) elapsing between end of transmission events and subsequent start of transmission events in the transmission signal received at the signal receiving circuitry from said signal transmitter of the at least one sensor, and
  produce, as a function of the duration measured, an output signal indicative of the energy harvested by the energy-harvesting electric generator of the at least one sensor.

As exemplified herein, the processing circuitry may comprise a look-up table circuit having stored therein candidate output signal values indicative of the energy harvested by the energy-harvesting electric generator for various durations of the time intervals elapsing between end of transmission events and subsequent start of transmission events in the transmission signal received at the signal receiving circuitry, and the processing circuitry may be configured to read from said look-up table circuit an output signal value selected out of said candidate output signal values as a function of said duration measured.

As exemplified herein, the processing circuitry may be configured to store at least one set of operating parameters of at least one respective sensor, said at least one set comprising operating parameters selected out of: a capacitance (for example, $C_{stor}$) of the capacitor, said upper threshold, said lower threshold, and a conversion efficiency of the energy-harvesting electric generator.

As exemplified herein, the processing circuitry may be configured to produce an output signal value indicative of the energy harvested by the energy-harvesting electric generator of the at least one respective sensor as a function of said duration measured and said set of operating parameters of the at least one respective sensor stored in the processing circuitry.

As exemplified herein, the processing circuitry may be configured to render at least one operating parameter in said at least one set of operating parameters selectively adjustable.

As exemplified herein, a system may comprise:
- a plurality of sensors according to one or more embodiments,
- signal receiving circuitry configured to receive the transmission signals transmitted by the signal transmitter of the sensors in said plurality of sensors, and
- processing circuitry coupled to the signal receiving circuitry and configured to:
  measure the duration of the time intervals elapsing between end of transmission events and subsequent start of transmission events in the transmission signals received at the signal receiving circuitry from the signal transmitter of the sensors in said plurality of sensors, and produce
  produce, as a function of the duration measured, output signals indicative of the energy harvested by the energy-harvesting electric generators of the sensors in said plurality of sensors.

As exemplified herein, the processing circuitry may comprise a central processing unit in a wireless sensor network.

As exemplified herein, a system may comprise a twilight switch coupled with the processing circuitry, the twilight switch being triggered as a function of said output signal indicative of the value of illuminance at the photosensitive surface of the photovoltaic generator of the at least one sensor. For instance, the twilight switch may switch to an ON state as a result of the value of illuminance being lower than a certain illuminance threshold, and to an OFF state as a result of the value of illuminance being higher than said illuminance threshold, possibly with hysteresis to avoid unstable behavior.

In one or more embodiments, such twilight switch may be "programmable", for example providing the possibility of setting and/or adjusting said illuminance threshold and/or the relative hysteresis margin. For instance, the twilight switch may be configured to be programmed via a smart phone, for example using an "app".

As exemplified herein, the signal receiving circuitry may comprise wireless signal receiving circuitry, preferably radio receiving circuitry, more preferably Bluetooth low energy radio receiving circuitry.

As exemplified herein, a method of operating a system according to one or more embodiments may comprise:
- sensing a voltage signal across the capacitor in the at least one sensor,
- generating an activation signal as a function of the voltage signal sensed, wherein said activation signal is switchable from a first value to a second value as a result of the voltage signal sensed reaching an upper threshold and from the second value to the first value as a result of the voltage signal sensed reaching a lower threshold,
- receiving the activation signal from the sensing circuit at the signal transmitter in the at least one sensor, and:
- activating the signal transmitter to transmit a transmission signal as a result of the activation signal being switched to the second value, and
- de-activating the signal transmitter to discontinue transmission of the transmission signal as a result of the activation signal being switched to the first value,
- receiving the transmission signal transmitted by the signal transmitter of the at least one sensor at the signal receiving circuitry,
- measuring the duration of the time intervals elapsing between end of transmission events and subsequent start of transmission events in the transmission signal received at the signal receiving circuitry from said signal transmitter of the at least one sensor, and
- producing, as a function of the duration measured, an output signal indicative of the energy harvested by the energy-harvesting electric generator of the at least one sensor.

Without prejudice to the underlying principles, the details and embodiments may vary, even significantly, with respect to what has been described by way of example only, without departing from the extent of protection.

The extent of protection is defined by the annexed claims.

The claims are an integral part of the technical teaching provided herein in respect of the embodiments.

The invention claimed is:

1. A sensor, comprising:
an energy-harvesting electric generator;
a capacitor coupled to the energy-harvesting electric generator and configured to store energy harvested by the energy-harvesting electric generator;
a sensing circuit coupled to the capacitor and configured to sense a voltage signal across the capacitor and generate an activation signal as a function of the sensed voltage signal, wherein said activation signal switches from a first value to a second value in response to the sensed voltage signal reaching an upper threshold and switches from the second value to the first value in response to the sensed voltage signal reaching a lower threshold; and
a signal transmitter coupled to the capacitor and powered from the capacitor, the signal transmitter further coupled to the sensing circuit, wherein the signal transmitter responds to the activation signal from the sensing circuit by operating to:
activate and transmit a transmission signal in response to the activation signal being switched to the second value; and
discontinue transmission of the transmission signal and deactivate in response to the activation signal being switched to the first value;
wherein a duration of a time interval elapsing between each de-activation and a subsequent activation of the signal transmitter provides information to a circuit receiving said transmission signal for determining of an amount of energy harvested by the energy-harvesting electric generator.

2. The sensor of claim 1, wherein the signal transmitter comprises a wireless signal transmitter.

3. The sensor of claim 1, wherein:
the energy-harvesting electric generator comprises a photovoltaic generator having a photosensitive surface; and
the duration of the time interval provides information that is indicative of an amount of illuminance received by the photosensitive surface of the photovoltaic generator.

4. The sensor of claim 1, wherein:
the energy-harvesting electric generator comprises a radio-frequency energy harvester having an antenna; and
the duration of the time interval provides information that is indicative of an amount of radio-frequency electromagnetic power received at the antenna of the radio-frequency energy harvester.

5. The sensor of claim 1, wherein:
the energy-harvesting electric generator comprises a vibrational energy harvester; and
the duration of the time interval provides information that is indicative of an amount of energy harvested by the vibrational energy harvester.

6. The sensor of claim 1, wherein:
the energy-harvesting electric generator comprises a thermoelectric energy harvester; and
the duration of the time interval provides information that is indicative of a temperature at the thermoelectric energy harvester.

7. The sensor of claim 1, wherein the circuit receiving said transmission signal comprises: a processing circuit configured to:
measure the duration of the time interval; and
produce, as a function of the duration measured, an output signal indicative of the energy harvested by the energy-harvesting electric generator of the at least one sensor.

8. A system, comprising:
a sensor, comprising:
an energy-harvesting electric generator;
a capacitor coupled to the energy-harvesting electric generator and configured to store energy harvested by the energy-harvesting electric generator;
a sensing circuit coupled to the capacitor and configured to sense a voltage signal across the capacitor and generate an activation signal as a function of the sensed voltage signal, wherein said activation signal switches from a first value to a second value in response to the sensed voltage signal reaching an upper threshold and switches from the second value to the first value in response to the sensed voltage signal reaching a lower threshold; and
a signal transmitter coupled to the capacitor and powered from the capacitor, the signal transmitter further coupled to the sensing circuit, wherein the signal transmitter responds to the activation signal from the sensing circuit by operating to:
activate and transmit a transmission signal in response to the activation signal being switched to the second value; and discontinue transmission of the transmission signal and deactivate in response to the activation signal being switched to the first value;

signal receiving circuitry configured to receive the transmission signal transmitted by the signal transmitter of the at least one sensor; and processing circuitry coupled to the signal receiving circuitry that is configured to:
- measure from received transmission signals a duration of a time interval elapsing between each de-activation and a subsequent activation of the signal transmitter; and
- produce, as a function of the measured duration, an output signal indicative of the energy harvested by the energy-harvesting electric generator of the at least one sensor.

9. The system of claim 8, wherein the processing circuitry comprises a look-up table circuit having stored therein candidate output signal values indicative of the energy harvested by the energy-harvesting electric generator for various measured durations of the time intervals, and wherein the processing circuitry is configured to read from said look-up table circuit an output signal value selected out of said candidate output signal values as a function of said measured duration.

10. The system of claim 8, wherein the processing circuitry is configured to store at least one set of operating parameters of at least one respective sensor, said at least one set comprising operating parameters selected out of the group consisting of:
- a capacitance of the capacitor;
- said upper threshold;
- said lower threshold; and
- a conversion efficiency of the energy-harvesting electric generator; and
- wherein the processing circuitry is configured to produce an output signal value indicative of the energy harvested by the energy-harvesting electric generator of the at least one sensor as a function of said measured duration and said set of operating parameters of the at least one respective sensor stored in the processing circuitry.

11. The system of claim 10, wherein the processing circuitry is configured to render at least one operating parameter in said at least one set of operating parameters selectively adjustable.

12. The system of claim 10, wherein:
the energy-harvesting electric generator comprises a photovoltaic generator having a photosensitive surface; and
the duration of the time interval provides information that is indicative of an amount of illuminance received by the photosensitive surface of the photovoltaic generator;
wherein said at least one set of operating parameters of at least one respective sensor comprises:
a conversion efficiency of the photovoltaic generator; and
an area of the photosensitive surface of the photovoltaic generator; and
wherein the processing circuitry is configured to produce an output signal value indicative of the illuminance at the photosensitive surface of the photovoltaic generator of the at least one sensor.

13. The system of claim 12, comprising a twilight switch coupled with the processing circuitry, the twilight switch being triggered as a function of said output signal indicative of the value of illuminance at the photosensitive surface of the photovoltaic generator of the at least one sensor.

14. The system of claim 10, wherein:
the energy-harvesting electric generator comprises a radio-frequency energy harvester having an antenna; and
the duration of the time interval provides information that is indicative of an amount of radio-frequency electromagnetic power received at the antenna of the radio-frequency energy harvester;
wherein said at least one set of operating parameters of at least one respective sensor comprises:
a conversion efficiency of the radio-frequency energy harvester; and
a gain factor of the antenna of the radio-frequency energy harvester; and
wherein the processing circuitry is configured to produce an output signal value indicative of the radio-frequency electromagnetic power received at the antenna of the radio-frequency energy harvester of the at least one sensor.

15. The system of claim 8, wherein the processing circuitry comprises a central processing unit in a wireless sensor network.

16. The system of claim 8, wherein the signal receiving circuitry comprises wireless signal receiving circuitry.

17. A system, comprising:
a plurality of sensors, wherein each sensor comprises:
an energy-harvesting electric generator;
a capacitor coupled to the energy-harvesting electric generator and configured to store energy harvested by the energy-harvesting electric generator;
a sensing circuit coupled to the capacitor and configured to sense a voltage signal across the capacitor and generate an activation signal as a function of the sensed voltage signal, wherein said activation signal switches from a first value to a second value in response to the sensed voltage signal reaching an upper threshold and switches from the second value to the first value in response to the sensed voltage signal reaching a lower threshold; and
a signal transmitter coupled to the capacitor and powered from the capacitor, the signal transmitter further coupled to the sensing circuit, wherein the signal transmitter responds to the activation signal from the sensing circuit by operating to:
activate and transmit a transmission signal in response to the activation signal being switched to the second value; and
discontinue transmission of the transmission signal and deactivate in response to the activation signal being switched to the first value;
signal receiving circuitry configured to receive the transmission signals transmitted by the signal transmitter of the sensors in said plurality of sensors; and
processing circuitry coupled to the signal receiving circuitry and configured to:
measure a duration of a time intervals elapsing between end of transmission events for de-activations of the signal transmitter and subsequent start of transmission events for subsequent activations of the signal transmitter relating to the transmission signals received at the signal receiving circuitry from the signal transmitter of the sensors in said plurality of sensors, and produce, as a function of the measured duration, output signals indicative of the energy harvested by the energy-harvesting electric generator of the sensors in said plurality of sensors.

18. The system of claim 17, wherein the processing circuitry comprises a central processing unit in a wireless sensor network.

19. The system of claim 17, wherein the signal receiving circuitry comprises wireless signal receiving circuitry.

20. The system of claim 17, wherein the processing circuitry comprises a look-up table circuit having stored therein candidate output signal values indicative of the energy harvested by the energy-harvesting electric generator for various measured durations of the time intervals, and wherein the processing circuitry is configured to read from said look-up table circuit an output signal value selected out of said candidate output signal values as a function of said measured duration.

\* \* \* \* \*